(12) United States Patent
Isenberg et al.

(10) Patent No.: US 8,820,224 B2
(45) Date of Patent: Sep. 2, 2014

(54) FOOD PROCESSING VAT WITH HEAT EXCHANGERS

(75) Inventors: Timothy J. Isenberg, Marshfield, WI (US); John E. Zirbel, Marshfield, WI (US)

(73) Assignee: Cheese & Whey Systems, Inc., Marshfield, WI (US)

(*) Notice: Subject to any disclaimer, the term of this patent is extended or adjusted under 35 U.S.C. 154(b) by 566 days.

(21) Appl. No.: 13/088,989

(22) Filed: Apr. 18, 2011

(65) Prior Publication Data

US 2011/0252981 A1 Oct. 20, 2011

Related U.S. Application Data

(60) Provisional application No. 61/325,612, filed on Apr. 19, 2010.

(51) Int. Cl.
*A23C 3/02* (2006.01)
(52) U.S. Cl.
USPC .......................................................... 99/453
(58) Field of Classification Search
CPC ........... F28F 27/02; F28F 3/14; B01F 15/065; B21D 53/045; B23P 15/26
USPC ...................................... 99/453; 29/890.053
See application file for complete search history.

(56) References Cited

U.S. PATENT DOCUMENTS

| | | | |
|---|---|---|---|
| 299,685 A | 6/1884 | Schwarzschild | |
| 2,274,220 A | 2/1942 | Sticelber | |
| 2,315,230 A | 3/1943 | Sticelber | |
| 2,365,670 A * | 12/1944 | Wallace | 205/73 |
| 2,814,114 A | 11/1957 | Nessler et al. | |
| 3,503,344 A | 3/1970 | Sternberg | |
| 3,541,687 A | 11/1970 | Peters | |
| 3,733,702 A | 5/1973 | Robertson et al. | |
| 3,751,010 A | 8/1973 | Latinen | |
| 3,831,246 A | 8/1974 | Morris | |
| 3,847,616 A | 11/1974 | Kaneko et al. | |
| 3,858,855 A | 1/1975 | Hazen | |
| 3,910,812 A | 10/1975 | Kaneko et al. | |
| 3,988,011 A | 10/1976 | Kressin | |
| 4,050,368 A | 9/1977 | Eakes | |
| 4,159,740 A | 7/1979 | Seiling | |
| 4,275,568 A | 6/1981 | Zielsdorf | |
| 4,321,860 A | 3/1982 | Hazen | |
| 4,479,423 A | 10/1984 | Schwitters et al. | |
| 4,628,805 A | 12/1986 | Derode | |

(Continued)

FOREIGN PATENT DOCUMENTS

EP 0206416 12/1986
FR 2561075 2/1985

*Primary Examiner* — John Wasaff
(74) *Attorney, Agent, or Firm* — Boyle Fredrickson, S.C.

(57) ABSTRACT

A food processing vat is provided with a zoned heat transfer system that includes a heat exchanger with a baffle that extends between a pair of spaced apart sheets. The baffle directs a flow of a heat transfer fluid through a void space between the sheets of the heat exchanger. The heat exchanger may also include multiple spaced apart posts that extend through the heat exchanger and around which the heat transfer fluid can flow. The posts and/or baffle may be defined by welded points of joinder between the sheets, and the sheets may be inflated to provide the space therebetween, such that the posts and/or baffles extend as webs of material that connect the sheets of the heat exchanger.

17 Claims, 6 Drawing Sheets

(56) References Cited

U.S. PATENT DOCUMENTS

| | | |
|---|---|---|
| 4,938,424 A | 7/1990 | Pittelko |
| 4,989,504 A | 2/1991 | Jay |
| 5,178,060 A | 1/1993 | Rusch et al. |
| 5,327,818 A | 7/1994 | Olivetti |
| 5,513,559 A | 5/1996 | Jay |
| 5,606,907 A | 3/1997 | Jay |
| 5,863,579 A | 1/1999 | Muzzarelli |
| 5,985,347 A | 11/1999 | Ejnik |
| 6,079,323 A | 6/2000 | Dzenis |
| 6,482,460 B1 | 11/2002 | Pikus et al. |
| 2006/0057249 A1 | 3/2006 | Bell et al. |
| 2007/0014893 A1 | 1/2007 | Misson et al. |
| 2008/0127834 A1 | 6/2008 | Bokelmann et al. |
| 2010/0034046 A1 | 2/2010 | Kitta |

* cited by examiner

FOOD PROCESSING VAT WITH HEAT EXCHANGERS

CROSS-REFERENCE TO RELATED APPLICATIONS

This application claims priority from U.S. Provisional Patent Application Ser. No. 61/325,612 filed on Apr. 19, 2010, the entirety of which is expressly incorporated by reference herein.

BACKGROUND OF THE INVENTION

1. Field of the Invention

The invention relates to food processing vats and, more particularly, to heat transfer systems for heating and cooling food processing vats.

2. Discussion of the Related Art

Heat transfer systems for use in food processing vats are known in the food processing industries. Such systems are widely used in equipment for processing semi-liquid food products, such as cheese vats.

Heat transfer systems used in cheese vats typically have hollow jackets that cover side walls of the vat. Steam, heated liquid, or cool liquid is introduced into the jacket. Introducing steam or heated liquid into the jacket warms the sidewalls of the vat and thus also warms the vat contents. Introducing cool liquid into the jacket cools the side walls of the vat and thus also cools the vat contents. In this way, the hollow jackets serve as heat exchangers for varying the temperature of the vat side walls.

SUMMARY OF THE INVENTION

The inventors have recognized that in food processing vats, cheese vats in particular, there are hot and cool spots which may lead to inconsistent heating of different portions of the vats. The inventors have recognized that in a typical vat, the heating jacket has a substantially continuously open space that is filled with a heating medium, which flows unrestricted between an inlet and an outlet, and that portions of the heating jacket near the inlet may be warmer than near the outlet. The inventors have also recognized that typical heating jackets of vats have some variation in the distance between walls of the heating jackets and correspondingly some variation in the dimensions of the openings or space within the heating jackets. The inventors have further recognized that such variation in the opening of the dimensions of the heating jackets may allow different amounts of heating medium to be held in or flow through different portions of the heating jacket, which may lead to heating inconsistencies of the different portions of the heating jacket and thus possible hot and cool spots. The present invention contemplates a heat transfer system that addresses these and other inventor-identified problems and drawbacks of the prior art.

In accordance with one aspect of the invention, a vat is provided that includes a bottom wall, side walls extending upwardly from the bottom wall, and a heat exchanger provided in at least one of the bottom and walls. The heat exchanger includes (i) a pair of sheets with at least parts of the sheets being spaced from each other and defining a void space therebetween and being configured to convey a heat transfer fluid therethrough, and (ii) a baffle extending between and connecting the sheets to each other, the baffle being spaced inwardly from an outer periphery of the heat exchanger and directing flow of the heat transfer fluid through the void space. The baffle may direct the heat transfer fluid through the heat exchanger in a manner that directs the heat transfer fluid across substantially the entire inner surface area of the heat exchanger, which may increase the heating consistency at different locations of the heat exchanger.

In accordance with another aspect of the invention, the flow path of the heat transfer fluid includes a pair of flow path segments in which the heat transfer fluid flows in different directions on opposing sides of the baffle. The heat exchanger may include multiple baffles directing the heat transfer fluid in a back-and-forth pattern of flow across the heat exchanger. The heat transfer fluid is directed back-and-forth with respect to a length dimension of the heat exchanger while the heat transfer fluid traverses across a width dimension of the heat exchanger. By directing the heat transfer fluid back-and-forth through the heat exchanger, the heat transfer fluid may exchange heat with itself, in addition to heating the vat contents, creating temperature equilibrium within the heat exchanger. This may reduce the likelihood of hot or cool spots being established within the heat exchanger.

In accordance with another aspect of the invention, a vat is provided that includes an outer jacket having an outer surface that defines an outer surface of the vat and an inner shell having an inner surface that defines an inner surface of the vat. A heat exchanger is provided between the outer jacket and inner shell and has a void space through which a heat transfer fluid can flow. Multiple posts extend through the void space such that heat transfer fluid flows around the multiple posts while flowing through the void space of the heat exchanger. The multiple posts may be spaced equidistant from each other and may define attachment points that hold the outer jacket and inner shell at the same distance from each other at different locations of the heat exchanger, which may enhance heating consistency of the heat exchanger at the different locations.

In accordance with another aspect of the invention, a method of making a food processing vat is provided that includes joining a pair of stacked sheets to each other and bending the pair of stacked sheets to a profile shape that corresponds to a profile shape of a bottom or side wall of a food processing vat. The pair of stacked sheets is attached to the food processing vat at a location that is associated with the bottom or side wall of the food processing vat. A heat exchanger is formed by inflating the pair of stacked sheets so as to create a void space between the sheets and through which a heat transfer fluid may be directed for transmitting heat to or removing heat from the bottom or side wall of the vat. The inflating may be performed pneumatically or hydraulically. Inflating the pair of stacked sheets may ensure that the sheets of the heat exchanger are spaced a common distance(s) from each other across the heat exchanger, which may enhance heating consistency of the heat exchanger at the different locations.

In accordance with another aspect of the invention, the step of attaching the pair of stacked sheets to the food processing vat is performed before the step of inflating the stacked sheets to form the heat exchanger. This may ensure that the sheets of the heat exchanger are bent to a common radius of curvature, which may help ensure that the sheets of the heat exchanger are spaced a common distance(s) from each other across the heat exchanger after the stacked sheets are inflated.

In accordance with another aspect of the invention, the stacked sheets are attached to each other by welding, at multiple locations. The welded stacked sheets may then be bent to a profile shape that corresponds to a profile shape of a bottom or side wall of a food processing vat, attached to the vat at a location that is associated with the bottom or side wall of the food processing vat, and then inflated to form the heat exchanger. While inflating, the weldments at the multiple locations may form into the baffle and multiple posts of the heat exchanger. The outer sheet may be thinner than the inner one, so that the outer sheet deforms during inflation as the inflationary force pushes it away from the inner sheet, while preserving the integrity of the inner sheet of the heat exchanger which may be the inner shell of the vat. After inflating, the outer sheet may extend in a curved cross-sectional profile away from the attachment locations between the sheets of the heat exchanger, at the multiple posts and/or baffle(s). The curved cross-sectional profile of the outer sheet may be the same for each of the multiple attachment locations between the sheets of the heat exchanger, which may provide consistent flow characteristics of the heat transfer fluid while it flows around the posts and is directed by the baffle(s) and consistent heating (or cooling) of the heat exchanger.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the Drawings.

DETAILED DESCRIPTION OF THE INVENTION

Figure 1:
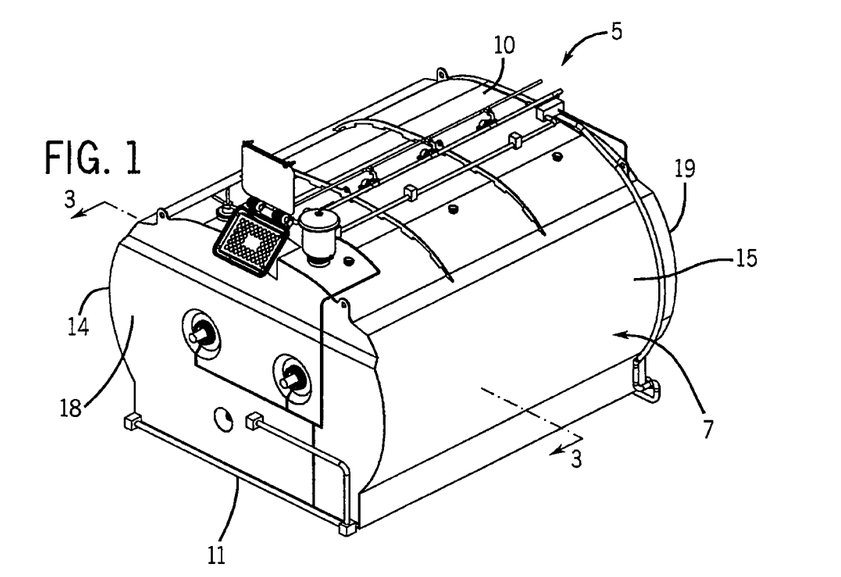
FIG. 1 is an isometric view from above and in front of a vat system incorporating a zoned heat transfer system in accordance with the present invention.
Figure 2:
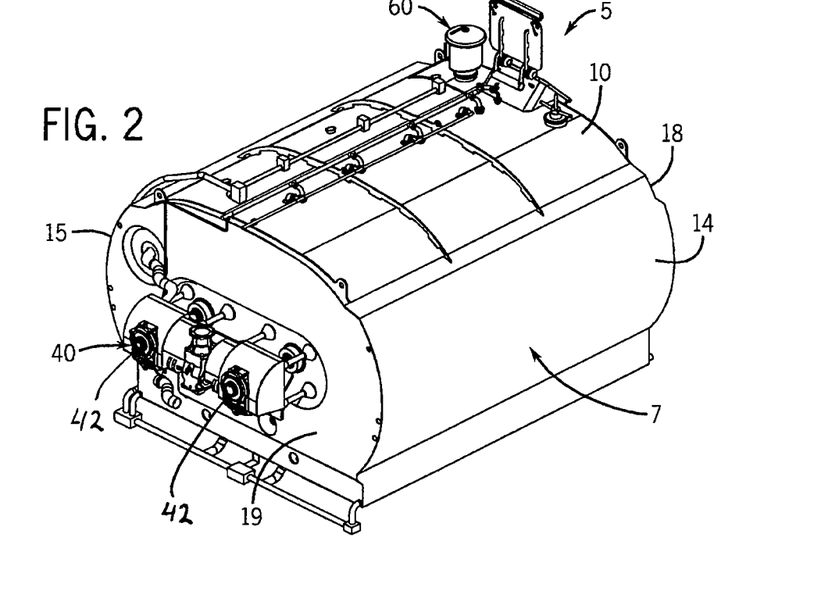
FIG. 2 is an isometric view from above and in back of the vat system of FIG. 1.

FIGS. 1 and 2 illustrate a vat system 5 that can be used for processing food and related products (collectively referred to as "vat contents 9") by mechanically manipulating and heating or cooling the vat contents 9, depending on the particular food or related product being processed. In a representative application, the vat system 5 may be used in the production of cheese, although it is understood that the vat system 5 may be used in processing other types of food products. It is also understood that the vat system 5 may be used for processing non-food liquid or semi-liquid compositions. The vat system 5 includes a vat 7 that has an agitation system 40 which performs the mechanical manipulations tasks by delivering power through a pair of drives 42 (FIG. 2) that rotate a pair of shafts 45 (FIG. 3) upon which blade assemblies are mounted, and a zoned heat transfer system 50 to perform such heating and/or cooling to provide zoned temperature control to the vat 7.

Referring now to FIGS. 1-4, vat 7 defines an enclosure having a top wall 10, a bottom wall 11, and side walls 14, 15, all of which extend longitudinally between a pair of end walls 18 and 19. The walls 10, 11, 14, 15, 18, 19 are multilayered, having an outer jacket 20 and an inner shell 25 (FIGS. 3 and 4) that are spaced from each other. Insulation and various components of the zoned heat transfer system 50 are housed between the jacket 20 and shell 25. Shown best in FIG. 3, the shell 25 is the inmost structure of the vat 7, so that its inner surface surrounds and defines an outer periphery of a void or inside space 8 within the vat 7. A lower part of the inside space 8 resembles two horizontal parallel cylinders that transversely intersect each other, being defined by a bottom wall 26 of the shell 25 that has a pair of arcuate depressions which extend along the length of the vat 7, on opposing sides of a longitudinally extending raised middle segment. From the opposing sides of the shell bottom wall 26, opposing shell side walls 27, 28 extend in an outwardly bowed manner, arching away from each other in a transverse direction of the vat 7. A shell top wall 29 arcs gradually between top edges of the shell side walls 27, 28 and defines an upper perimeter of the inside space 8 of vat 7.

Figure 3:
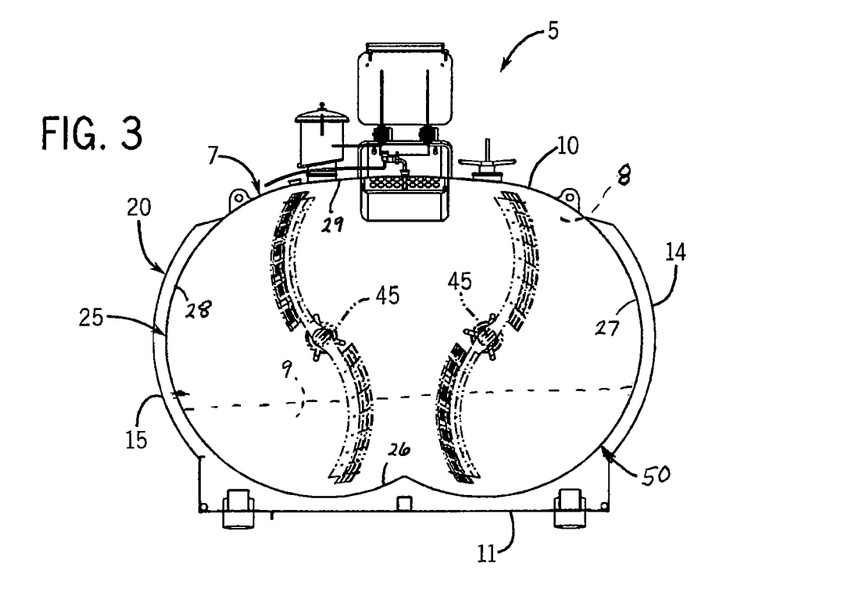
FIG. 3 is a sectional view of the vat system of FIG. 1, taken at line 3-3 of FIG. 1.
Figure 4:
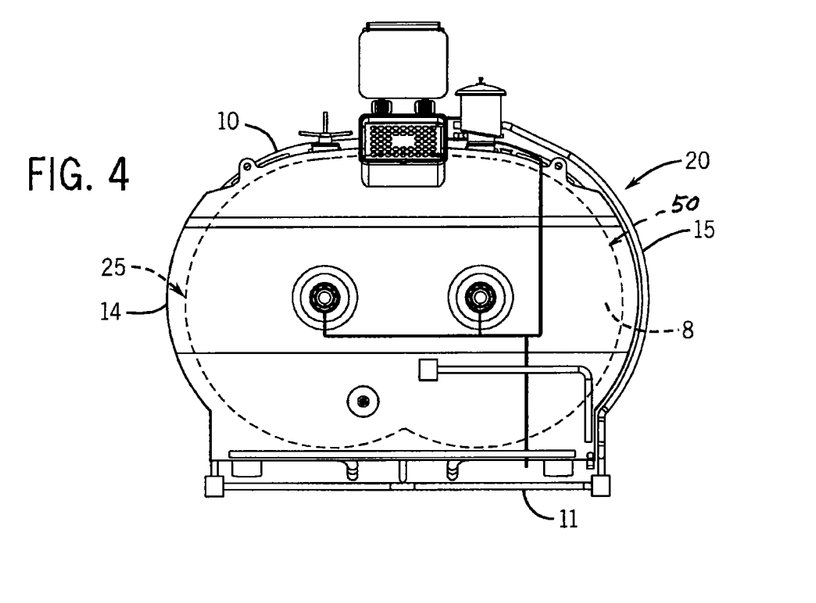
FIG. 4 is another sectional view of the vat system of FIG. 1.

Referring now to FIGS. 3 and 4, the inside space 8 of vat 7 and the food product being processed in vat 7, in other words the vat contents 9, are heated and/or cooled with the zoned heat transfer system 50 by selectively transmitting heat through or removing heat from different portions of one or more of the vat bottom and side walls 11, 14, 15. The amount of heat to transmit to or remove from the vat contents, as well as the particular portions of the vat 7 from which to transmit heat to or remove heat from, are selected based on a target batch size and/or target temperature of the vat contents, explained in more detail elsewhere herein.

Figure 5:
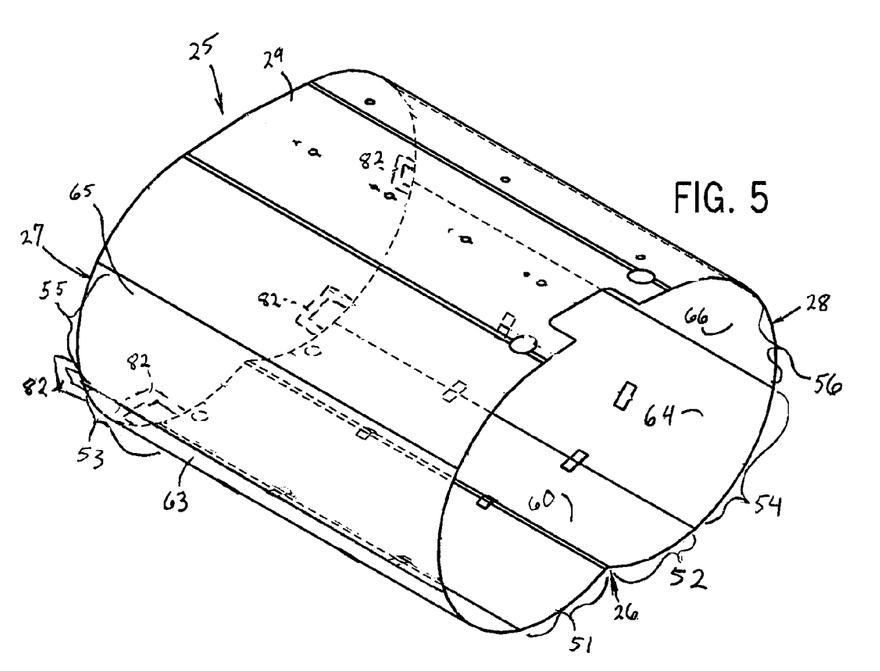
FIG. 5 is a schematic isometric view of a shell incorporating a zoned heat transfer system.
Figure 6:
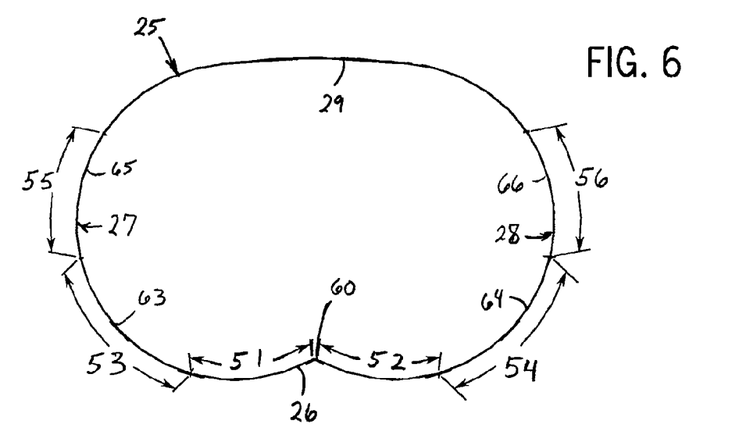
FIG. 6 is a schematic front elevation of the zoned heat transfer system of FIG. 5.

Referring now to FIGS. 5 and 6, the zoned heat transfer system 50 of this embodiment has multiple heat transfer zones. Toward the bottom of the vat 7, two lower heat transfer zones 51, 52 are defined along the bottom wall 26 of the shell 25. The lower heat transfer zones 51, 52 are positioned to direct heat transfer activity generally vertically up through the bottom of the vat 7, with lower heat transfer zone 51 being positioned below one agitator shaft 45 (FIG. 3) and lower heat transfer zone 52 being positioned below another agitator shaft 45 (FIG. 3).

Still referring to FIGS. 5 and 6, a pair of intermediate heat transfer zones 53, 54 is positioned laterally beyond the lower heat transfer zones 51, 52. Intermediate heat transfer zone 53 is adjacent the lower heat transfer zone 51 and extends across (i) an upper and/or outer portion of the bottom wall 26 shown on the left side of FIG. 6, and (ii) a lower and/or inner portion of the sidewall 27. Intermediate heat transfer zone 54 is adjacent the lower heat transfer zone 52 and extends across (i) an upper and/or outer portion of the bottom wall 26 shown on the right side of FIG. 6, and (ii) a lower and/or inner portion of the sidewall 28. This arrangement provides the intermediate heat transfer zones 53, 54, with generally obliquely facing orientations, whereby the intermediate heat transfer zones 53, 54 direct heat transfer activity generally obliquely through the space inside 8, toward the middle of vat 7.

Still referring to FIGS. 5 and 6, a pair of upper heat transfer zones 55, 56 is positioned laterally beyond and also higher than the lower and intermediate heat transfer zones 51, 52, 53, 54. Upper heat transfer zone 55 is adjacent the intermediate heat transfer zone 53 and extends up the sidewall 27, toward the top wall 29. Upper heat transfer zone 56 is adjacent intermediate heat transfer zone 54 and extends up the sidewall 28, toward the top wall 29. The upper heat transfer zones 55, 56 are arranged in generally vertical orientations, so that they direct heat transfer activity generally transversely from the sides of the vat 7, toward each other. The upper heat transfer zones 55, 56 extend between upper and lower halves of the vat 7. In this embodiment, lower edges of the upper heat transfer zones 55, 56 are provided at a height that is about 35% of an overall height of the inside space 8 of vat 7. Upper edges of the upper heat transfer zones 55, 56 are provided at a height that is about 80% of the overall height inside of the vat 7. It is understood, however, that there can be any number of the various heat transfer zones and that the relative heights and positions may be other than those described, so long as the desired zoned temperature control may be achieved for a particular implementation.

Figure 7:
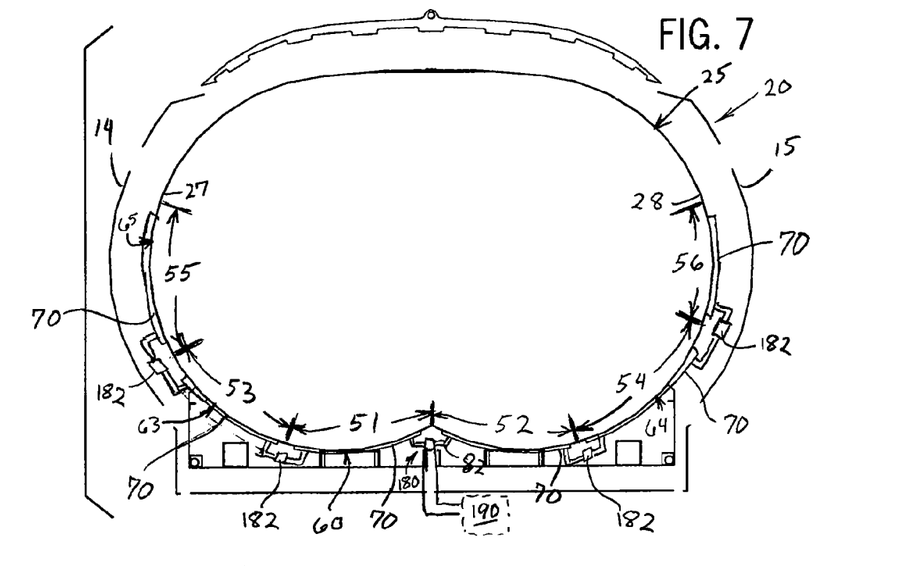
FIG. 7 is a partially schematic sectional view of the vat system of FIG. 1.
Figure 8:
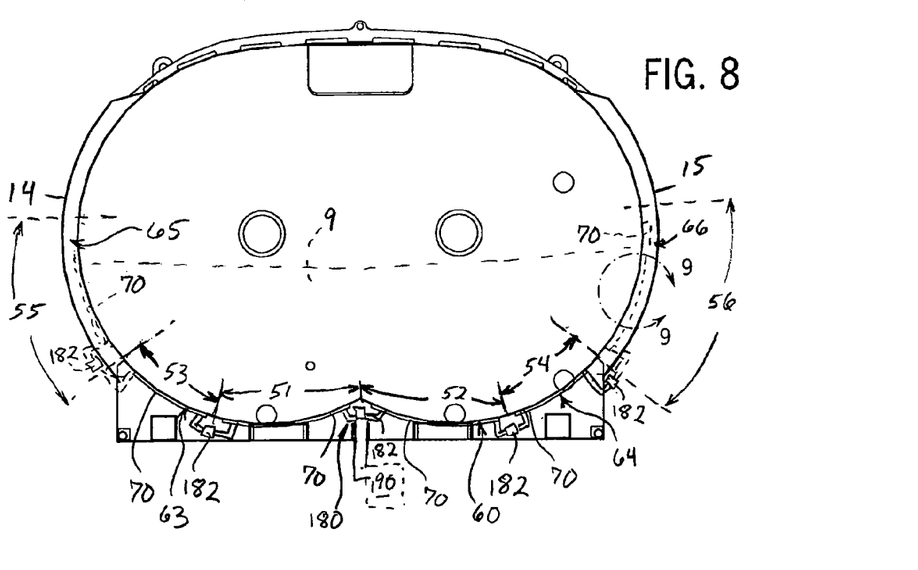
FIG. 8 is another partially schematic sectional view of the vat system of FIG. 1.
Figure 10:
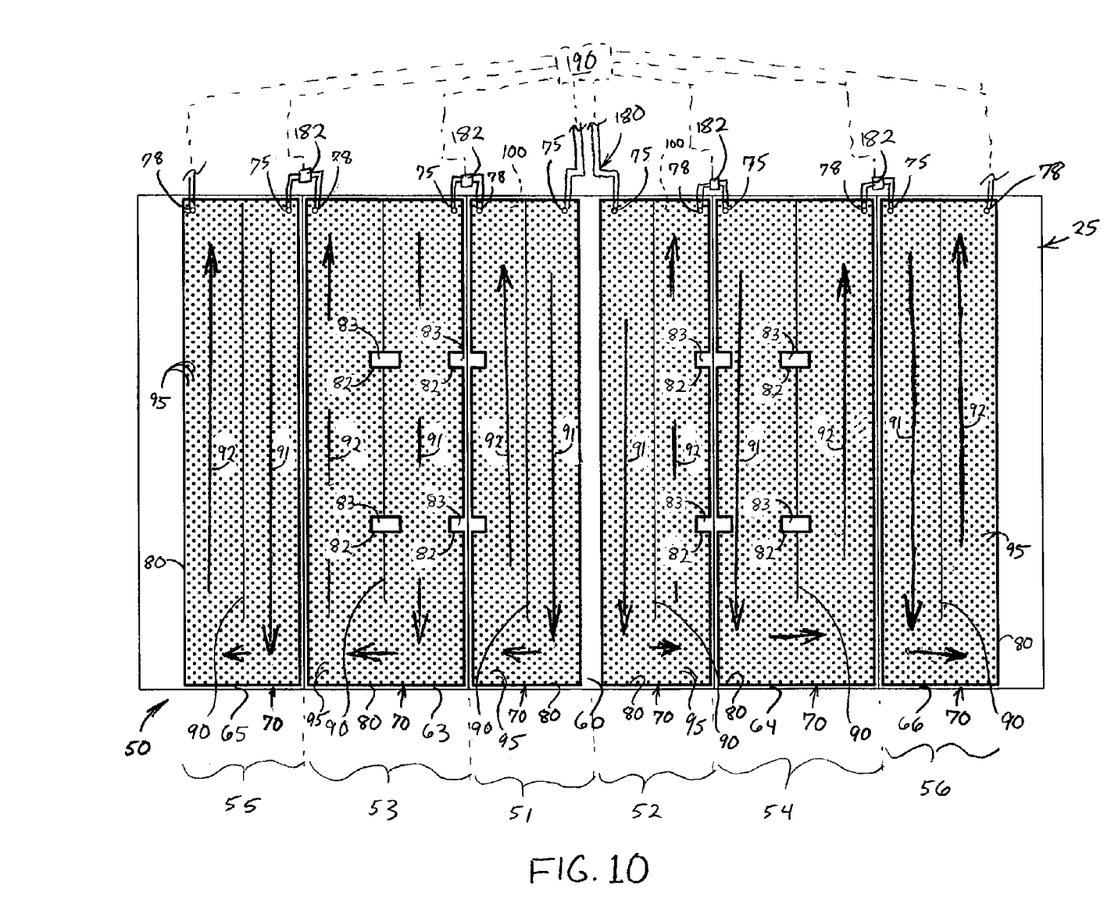
FIG. 10 is a schematic view of a zoned heat transfer system.

Referring now to FIGS. 7, 8, and 10, a diverter system 180 distributes a heat transfer fluid 100 through the heat transfer system 50 for introducing heat into or removing heat from the vat contents 9 (FIG. 3). Diverter system 180 includes diverters 182 that, in this embodiment, are electromechanical valves that are actuated and controlled by controls 190. Controls 190 include an industrial computer or, e.g., a programmable logic controller (PLC), along with corresponding software and suitable hardware that allow a user to input operating parameters, such as a target size of a batch of food product, or a target temperature for the processing of the food producing, the target temperature including desired variations of the temperature over time while processing a batch.

Referring again to FIGS. 5 and 6, in this embodiment, the lower, intermediate, and upper heat transfer zones 51, 52, 53, 54, 55, 56, respectively, are defined by respective heat exchangers 70 of multiple interconnected curved panels 60, 63, 64, 65, 66 that in combination define the shell 25 and through which heat can be transmitted. The lower heat transfer zones 51, 52 are defined by a pair of heat exchangers 70 in panel 60. Intermediate heat transfer zones 53 and 54 are defined by the heat exchangers 70 of panels 63 and 64, respectively. Upper heat exchangers 55 and 56 are defined by the heat exchangers 70 of panels 65 and 66, respectively.

Figure 9:
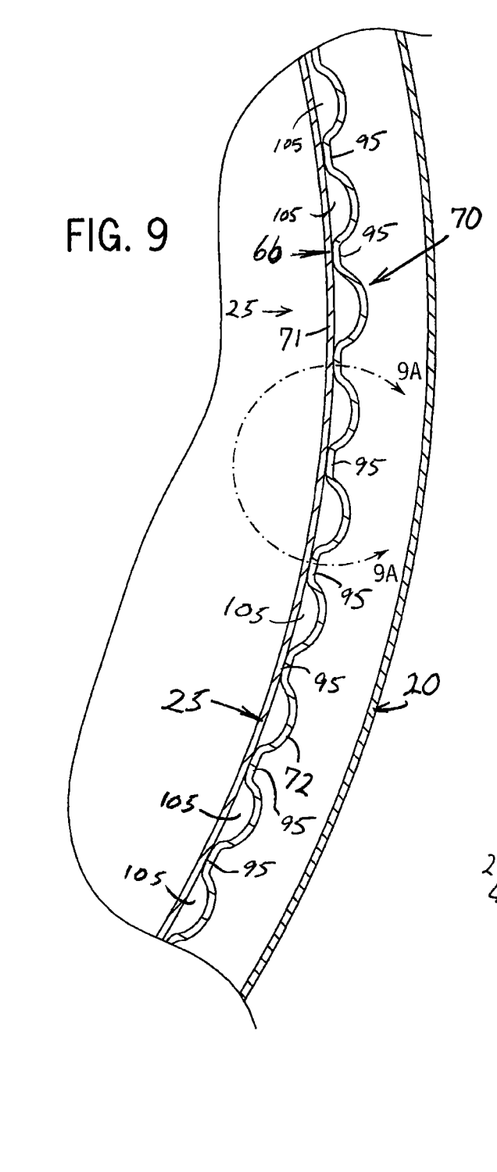
FIG. 9 is a sectional view of a heat exchanger of FIG. 8, taken at the curved line 9-9 of FIG. 8.
Figure 9A:
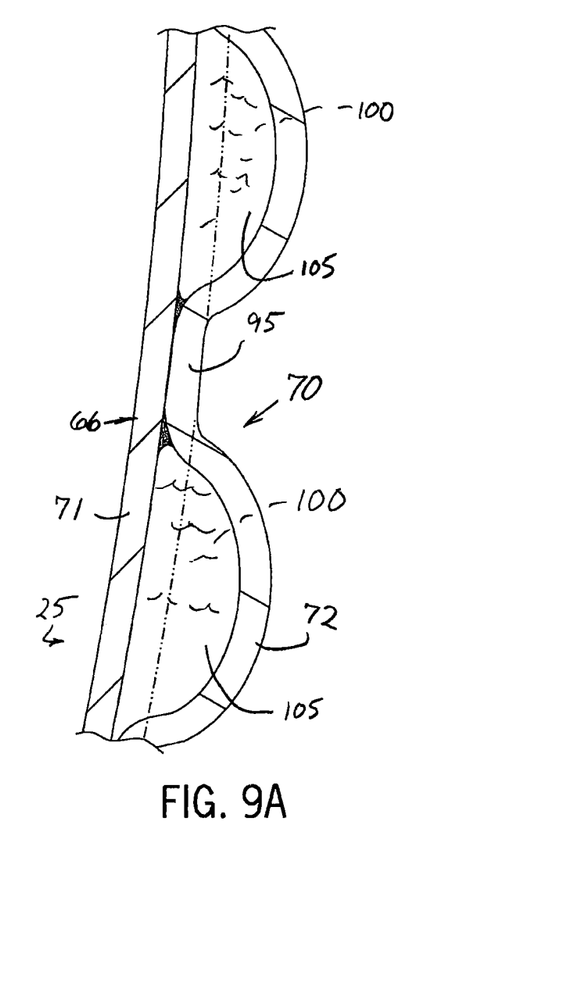
FIG. 9A is a close-up sectional view of the heat exchanger of FIG. 9, taken at the curved line 9A-9A.

Referring now to FIGS. 9 and 9A, each heat exchanger 70 of the panels 60, 63, 64, 65, 66 (FIGS. 5 and 6) includes a pair of stacked sheets, namely an inner sheet 71 and an outer sheet 72. The inner and outer sheets 71 and 72, respectively, of the heat exchangers 70 are at least partially spaced from each other, defining a void space 105 therebetween through which a heat transfer fluid 100 is conveyed. In this embodiment, the inner sheets 71 of the heat exchangers 70 of the panels 60, 63, 64, 65, 66 are connected to each other and cumulatively define a major portion of the shell 25. The outer sheets 72 overlie or are outside of an outwardly facing surface of such portion of the shell 25.

Referring now to FIG. 10 which schematically shows the zoned heat transfer system 50 in and un-curled or flattened position, each heat exchanger 70 has an inlet 75 through which the heat transfer fluid 100 enters the heat exchanger 70 and an outlet 78 through which the heat transfer fluid 100 exits the heat exchanger. In this embodiment, the inlets 75 and outlets 78 are mounted to the heat exchanger 70 at the same side or end of the vat 7 (FIGS. 1 and 2). In another embodiment, the inlets 75 and outlets 78 are provided at different sides or ends of the vat. Still referring to FIG. 10, in this embodiment, adjacent heat exchangers 70 are connected in series with each other so that the heat transfer fluid 100 flows sequentially through the lower, intermediate, and upper heat transfer zones 51, 52, 53, 54, 55, and 56, respectively, defined at the respective panels 60, 63, 64, 65, 66. This is done by connecting an outlet 78 of a heat exchanger 70 to an inlet 75 of a downstream heat exchanger 70, whereby the inlet 75 of the downstream heat exchanger 70 intakes the heat transfer fluid 100 that is discharged from the preceding outlet 78 of the upstream heat exchanger 70. In another embodiment (not shown), in addition to or instead of such series connection of the lower, intermediate, and upper heat transfer zones 51, 52, 53, 54, 55, and 56, respectively, of the panels 60, 63, 64, 65, 66, they are connected to each other in parallel. In this other embodiment, inlets 75 of heat exchangers 70 are connected to each other and outlets 78 are connected to each other, such that the heat transfer fluid 100 is divided and simultaneously flows through the respective heat exchanges 70. Regardless of the particular connection type between the heat exchangers 70, the zoned heat transfer system 50 includes suitable hardware connecting them to each other, and suitable controls and cooperating valves such as diverters 182 (FIG. 10) to selectively divert the heat transfer fluid 100 through the zoned heat transfer system 50, based on the intended end-use of the vat 7.

Referring now to FIGS. 9, 9A, and 10, within each of the heat exchangers 70, the inner and outer sheets 71 and 72 (FIGS. 9 and 9A) are connected to each other with a continuously extending perimeter seam 80 (FIG. 10) that extends about the perimeter of the void space 105 (FIGS. 9 and 9A) of the heat exchanger 70, defining a generally rectangular closed perimeter shape. The perimeter seam 80 of this embodiment may be made by laser welding the inner and outer sheets 71, 72 together along a weldment path that coincides with the perimeter seam 80 layout. Inner seams 82 connect the inner and outer sheets 71, 72 to each other to define rectangular pads 83 in the heat exchangers 70 that are separated from the void space 105 and to which an underlying frame that supports the vat 7 is attached to the bottom wall 11.

Referring now to FIG. 10, within each heat exchanger 70, a baffle 90 is provided that extends in a longitudinal direction through a major portion of the length of the heat exchanger 70. The baffle extends through the void space 105 and defines a line of connection between the inner and outer sheets 71 and 72 (FIGS. 9 and 9A), providing a flow barrier. Accordingly, each baffle 90 provides a back-and-forth or serpentine flow path for the heat transfer fluid that flows through the heat exchanger 70. In other words, in this configuration, heat transfer fluid 100 is directed back-and-forth with respect to a length dimension of the heat exchanger 70 while the fluid 100 traverses across a width dimension of the heat exchanger 70. In this configuration, when the heat transfer fluid 100 flows through the heat exchanger 70, different flow path segments of the fluid 100 are defined at different portions of the heat exchanger 70. A pair of flow path segments 91, 92 in which the heat transfer fluid 100 flows in different directions is defined on opposing sides of each of the baffles 90.

Still referring to FIG. 10, directing the heat transfer fluid 100 back-and-forth through the heat exchanger 70, in flow paths segments 91, 92 of opposite directions on opposing sides of the baffles 90, allows the heat transfer fluid 100 to exchange heat with itself, in addition to heating or cooling the contents of the vat 7 (FIGS. 1 and 2), creating a temperature equilibrium within the heat exchanger 70. This allows a temperature equilibrium to be established within each of the lower, intermediate, and upper heat transfer zones 51, 52, 53, 54, 55, and 56, respectively, of the panels 60, 63, 64, 65, 66, while also allowing temperature differentials to be established between different lower, intermediate, and upper heat transfer zones 51, 52, 53, 54, 55, and 56, respectively, by deactivating some of the heat transfer zones 51, 52, 53, 54, 55, and 56 with the controls 190. Although a single baffle 90 is shown in each heat exchanger 70, it is understood that at least one, or multiple ones, of the heat exchangers 70 may have multiple baffles 90 to provide even more pairs of alternating flow path segments through the heat exchanger(s) 70.

Referring again to FIGS. 9, 9A, and 10, each heat exchanger 70 also includes posts 95 that have circular cross-sections that extends through the void space 105, between and connecting the inner and outer sheets 71, 72 to each other. The posts 95 are provided at locations that are inward of the perimeter seams 80. Each post 95 may have a diameter of about 0.60 inch and adjacent posts 95 may spaced from each other by about 2 inches, although it is understood that other diameters, perimeter shapes, and spacing may be used for the posts 95. This provides numerous posts 95 that are equally spaced from each other and provide an orderly array or matrix that can maintain a constant spacing between the inner and outer sheets 71, 72 during fabrication of the shell 25 and use of the vat 7.

During fabrication of the shell 25, in this embodiment, for each panel 60, 63, 64, 65, 66, the posts 95 and baffles 90 may be formed by laser welding the inner and outer sheets 71, 72 to each other along corresponding weldment paths, like the perimeter and inner seams 80, 82. After such welding of the inner and outer sheets 71, 72, respectively, the panels 60, 63, 64, 65, 66 are bent to obtain curved profile shapes that correspond to profile shapes of different respective portions of the shell 25 (FIGS. 5 and 6). The curved adjacent panels 60, 63, 64, 65, 66 are welded to each other and the heat exchangers 70 are inflated to create the void space 105 between the inner and outer sheets 71, 72. In one embodiment, the heat exchangers 70 are inflated pneumatically. In another embodiment, the heat exchangers 70 are inflated hydraulically.

In this embodiment, in each of the panels 60, 63, 64, 65, 66, the inner sheet 71 is thicker than the outer sheet 72. Since the inner sheet 71 is thicker than the outer sheet 72, the inner sheet 71 maintains its curved shape during inflation of the heat exchanger 70 while the outer sheet 72 deforms as the inflationary force pushes it away from the inner sheet 71. During inflation of the heat exchanger 70, the inner and outer sheets 71, 72, respectively, stay connected to each other at the weldment locations of the perimeter and inner seams 80, 82, baffles 90, and posts 95. This provides the outer sheet 72 with a curved cross-sectional profile extending away from the each of the weldments, giving a pillow-like configuration to the outer surface of the outer sheet 72.

Various alternatives and embodiments are contemplated as being within the scope of the following claims particularly pointing out and distinctly claiming the subject matter regarded as the invention.

We claim:

1. A vat system comprising:
   a vat that includes a bottom wall and side walls extending upwardly from the bottom wall and an inside space of the vat defined inwardly of the bottom and side walls; and
   a heat exchanger provided in at least one of the bottom and side walls, including:
   (i) a pair of sheets comprising an inner sheet arranged relatively closer to the inside space of the vat and an outer sheet arranged relatively further from the inside space of the vat, wherein the inner and outer sheets are connected through an array of connections at spaced-apart connection locations with at least parts of the inner and outer sheets being spaced from each other and defining a void space of the heat exchanger inwardly of curved cross-sectional profile segments of the outer sheet between adjacent connection locations of the inner and outer sheets, the void space of the heat exchanger being configured to convey a heat transfer fluid therethrough; and
   (ii) a baffle extending between and connecting the sheets to each other, at least part of the baffle being spaced inwardly from an outer periphery of the heat exchanger and directing flow of the heat transfer fluid through the void space of the heat exchanger.

2. The vat system of claim 1 wherein the flow path of the heat transfer fluid includes a pair of flow path segments in which the heat transfer fluid flows in different directions on opposing sides of the baffle.

3. The vat system of claim 2 further comprising multiple baffles directing the heat transfer fluid in a back-and-forth pattern of flow across the heat exchanger.

4. The vat system of claim 3, wherein the heat transfer fluid is directed back-and-forth with respect to a length dimension of the heat exchanger while the heat transfer fluid traverses across a width dimension of the heat exchanger.

5. The vat system of claim 1, wherein the connection locations are defined by multiple posts extending between the sheets and being spaced from the baffle so that the heat transfer fluid flows around the multiple posts while being directed through the heat exchanger by the baffle.

6. The vat system of claim 1, wherein the at least one of the bottom and side walls in which the heat exchanger is provided includes an inner shell and an outer jacket that is spaced from and overlies the inner shell such that the heat exchanger is positioned between the inner shell and outer jacket.

7. The vat system of claim 6, wherein the inner shell defines one sheet of the pair of sheets of the heat exchanger.

8. The vat system of claim 7, wherein an outer sheet defines the other sheet of the pair of sheets of the heat exchanger and is spaced from the outer jacket.

9. The vat system of claim 7, wherein the outer sheet is attached to the inner shell at multiple attachment locations that are spaced equidistant from each other.

10. The vat system of claim 9, wherein the outer sheet extends in a curved cross-sectional profile away from the attachment locations with the inner shell.

11. The vat system of claim 10, wherein the curved cross-sectional profile is formed by inflating the heat exchanger so as to push the outer sheet away from the inner shell.

12. A vat comprising:
   an outer jacket having an outer surface that defines an outer surface of the vat;
   an inner shell having an inner surface that defines an inner surface of the vat; and
   a heat exchanger provided between the outer jacket and inner shell and including an inner sheet defining the inside surface of the vat and an outer sheet arranged outwardly of the inner sheet, the heat exchanger having a void space through which a heat transfer fluid can flow and multiple posts connecting the inner and outer sheets to define curved cross-sectional profiles of the outer sheet between adjacent posts, the multiple posts extending through the void space such that heat transfer fluid flows around the multiple posts while flowing through the void space of the heat exchanger.

13. The vat of claim 12, wherein the heat exchanger includes a pair of sheets with at least parts of the sheets being spaced from each other such that the void space of the heat exchanger is defined between the pair of sheets.

14. The vat of claim 13, wherein (i) the inner shell defines one sheet of the pair of sheets of the heat exchanger, and (ii) an outer sheet defines the other sheet of the pair of sheets of the heat exchanger.

15. The vat of claim 14, further comprising a baffle extending between and connecting the outer sheet and the inner shell to each other and directing flow of the heat transfer fluid through the void space.

16. The vat of claim 14, at least one of the baffle and multiple posts being defined by a weldment between the outer sheet and inner shell.

17. The vat of claim 16, further comprising multiple baffles directing the heat transfer fluid in a back-and-forth pattern of flow across the heat exchanger.

* * * * *